US011951482B2

(12) United States Patent
Kinney et al.

(10) Patent No.: US 11,951,482 B2
(45) Date of Patent: Apr. 9, 2024

(54) CARTRIDGE AND ELECTROWETTING SAMPLE PROCESSING SYSTEM WITH DELIVERY ZONE

(71) Applicant: TECAN TRADING AG, Mannedorf (CH)

(72) Inventors: Patrick Kinney, Hayward, CA (US); Tiffany Ding (Lay), San Jose, CA (US); Manjeet Dhindsa, San Jose, CA (US); Daniel Tran, San Jose, CA (US); Jennifer Ji, Fremont, CA (US); Sujata Iyer, San Jose, CA (US); Tin Ngo, San Jose, CA (US)

(73) Assignee: TECAN TRADING AG, Mannedorf (CH)

( * ) Notice: Subject to any disclaimer, the term of this patent is extended or adjusted under 35 U.S.C. 154(b) by 38 days.

(21) Appl. No.: 17/559,362

(22) Filed: Dec. 22, 2021

(65) Prior Publication Data

US 2022/0111388 A1 Apr. 14, 2022

Related U.S. Application Data

(62) Division of application No. 15/962,892, filed on Apr. 25, 2018, now abandoned.

(51) Int. Cl.
*B01L 3/00* (2006.01)

(52) U.S. Cl.
CPC . *B01L 3/502792* (2013.01); *B01L 2400/0427* (2013.01)

(58) Field of Classification Search
CPC .......... B01L 3/502792; B01L 3/50273; B01L 2300/0645; B01L 2400/0427
See application file for complete search history.

(56) References Cited

U.S. PATENT DOCUMENTS

| | | | | |
|---|---|---|---|---|
| 2002/0043463 A1* | 4/2002 | Shenderov | B01L 3/502784 | 204/603 |
| 2006/0194331 A1* | 8/2006 | Pamula | B81B 3/0021 | 422/400 |
| 2008/0135411 A1* | 6/2008 | Whitehead | B01L 3/502792 | 204/450 |

(Continued)

FOREIGN PATENT DOCUMENTS

| | | | | |
|---|---|---|---|---|
| WO | 2014/187488 A1 | 11/2014 | | |
| WO | WO-2014187488 A1 * | 11/2014 | B01L 3/502715 | |

*Primary Examiner* — Caitlyn Mingyun Sun
(74) *Attorney, Agent, or Firm* — Notaro, Michalos & Zaccaria P.C.

(57) ABSTRACT

A cartridge, in particular a disposable cartridge, for use in an electrowetting sample processing system. The cartridge has a liquid input port for introducing an input liquid into an internal gap of the cartridge, the input liquid providing for at least one droplet, directly or via a liquid separation process within the internal gap, and the internal gap having at least one hydrophobic surface, at least one processing zone for processing samples located in the processing zone, and a delivery zone for delivering the at least one droplet from the liquid input port to the at least one processing zone. The delivery zone is configured to provide a repeating pattern of interacting electrowetting force for simultaneously transporting the at least one droplet within the delivery zone.

44 Claims, 9 Drawing Sheets

(56) References Cited

U.S. PATENT DOCUMENTS

| | | | | |
|---|---|---|---|---|
| 2008/0281471 | A1* | 11/2008 | Smith | B01L 3/502792 422/50 |
| 2010/0236929 | A1* | 9/2010 | Pollack | B01L 3/50273 204/600 |
| 2013/0020202 | A1 | 1/2013 | Feiglin et al. | |
| 2016/0231324 | A1* | 8/2016 | Zhao | G01N 33/57496 |
| 2017/0307594 | A1* | 10/2017 | Iyer | B01L 3/50273 |

* cited by examiner

CARTRIDGE AND ELECTROWETTING SAMPLE PROCESSING SYSTEM WITH DELIVERY ZONE

RELATED APPLICATION

This patent application is a divisional of U.S. patent application Ser. No. 15/962,892, filed on Apr. 25, 2018, the whole content thereof being incorporated into the present application by explicit reference for any purpose

TECHNICAL FIELD OF THE INVENTION

The current invention relates to a cartridge, in particular a disposable cartridge for use in an electrowetting sample processing system, an electrowetting sample processing system and a method for operating such a cartridge or system.

DESCRIPTION OF THE RELATED ART

WO 2014/187488 A1 describes a microfluidic system with multiple zones, wherein the liquid droplets are manipulated by individually connected electrodes.

SUMMARY OF THE INVENTION

In the current invention, a problem to be solved is to provide a cartridge and an electrowetting sample processing system having reduced wiring efforts.

This problem is solved by a cartridge with the features of claim 1. Further embodiments of the cartridge, an electrowetting sample processing system with or without such a cartridge, as well as a method for operating such a cartridge or system are defined by the features of further claims.

A cartridge according to the invention, in particular a disposable cartridge for use in an electrowetting sample processing system, comprises a liquid input port for introducing an input liquid into an internal gap of the cartridge. The input liquid providing for at least one droplet, directly or via a liquid separation process within the cartridge. The internal gap comprises at least one hydrophobic surface. The cartridge further comprises at least one processing zone for processing samples located in the processing zone, and a delivery zone for delivering the at least one droplet from the liquid input port to the at least one processing zone. The delivery zone is configured to provide a repeating pattern of interacting electrowetting force for simultaneously transporting the at least one droplet within the delivery zone. The inventive cartridge allows reduced wiring efforts while further proper delivering the droplets within at least the delivery zone.

In an embodiment of the inventive cartridge, the cartridge comprises at least two separate processing zones for simultaneously and/or identically processing samples located in the at least two processing zones.

In one embodiment, the processing zone is at least one of: a reaction zone, a measurement zone such as an optical reading zone, a bypass zone and a staging zone.

In an embodiment of the inventive cartridge, the droplet is a microfluidic droplet and/or a liquid comprising at least one of: a reagent, a buffer, a diluent, an extraction liquid, a washing liquid and a suspension, which in particular is a suspension of magnetic beads, single cells or cell aggregates.

In an embodiment, the cartridge comprises a first part with the liquid input port and a second part attached to the first part, such that the gap is formed between the first part and the second part.

In an embodiment of the inventive cartridge, the first part comprises a rigid body and/or the second part comprises an electrode support element or a flexible film, in particular a polymer film and/or an electrically isolating film, and wherein in particular the second part is attached to a peripheral side structure of the first part.

In an embodiment, the second part of the cartridge, in particular the flexible film or the membrane, is reversibly attachable to the electrodes of the electrowetting sample processing system.

In an embodiment of the inventive cartridge, the gap is defined by a spacer that is arranged between the first part and the second part, wherein in particular the spacer comprises the input port, and/or by the shape of at least one of the two parts of the cartridge, in particular by a flexible part or a rigid part of the cartridge.

In an embodiment of the inventive cartridge, the delivery zone comprises a plurality of electrodes, in particular an electrode array, for applying an electrowetting force to the microfluidic droplets.

In an embodiment of the inventive cartridge, the delivery zone comprises substantially identical and spaced apart electrodes that are electrically connected to a common electrical interface of the cartridge.

In an embodiment of the inventive cartridge, the repeated pattern comprises at least four electrodes in longitudinal direction, at least two of them being operated differently.

In an embodiment, the cartridge is configured to manipulate droplets located in the processing zones independently and/or asynchronously from droplets located in the delivery zone.

In an embodiment, the cartridge further comprises at least one waste removal zone configured to provide a repeated pattern of electrowetting force for simultaneously transporting the at least one droplet within the waste removal zone.

In an embodiment of the inventive cartridge, the waste removal zone is arranged adjacent to the processing zone and opposite to the delivery zone, further comprising at least one optical reading zone adjacent to the processing zone.

In an embodiment, the cartridge further comprises a waste removal line with an output port, which in particular is arranged adjacent to the liquid input port.

In an embodiment, the processing zone is configured for processing at least one of a chemical reaction, a washing process, a heating process, a mixing process, a dilution, and a hybridization.

In an embodiment, the processing zone is configured for processing a PCR (Polymerase chain reaction) process and/or a hybridization.

The features of the above-mentioned embodiments of the cartridge can be used in any combination, unless they contradict each other.

An electrowetting sample processing system according to the invention, in particular a biological sample processing system, comprises a cartridge according to anyone of the preceding embodiments.

An electrowetting sample processing system according to the invention, in particular a biological sample processing system, comprises a liquid input port for introducing an input liquid into an internal gap of the electrowetting sample processing system. The input liquid providing for at least one droplet, directly or via a liquid separation process within the internal gap. The internal gap comprises at least one hydrophobic surface. Further comprised is at least one processing zone for processing samples located in the processing zone, and a delivery zone for delivering the at least one droplet from the liquid input port to the at least one processing zone. The delivery zone is configured to provide a repeating pattern of interacting electrowetting force for simultaneously transporting the at least one droplet within the delivery zone.

In an embodiment, the electrowetting sample processing system comprises at least two separate processing zones for simultaneously and/or identically processing samples located in the at least two processing zones.

In an embodiment, the electrowetting sample processing system further comprises a spacer that defines the height of the internal gap.

In an embodiment, the electrowetting sample processing system further comprises a plurality of electrodes for applying an electrowetting force to the droplets, in particular an electrode array, further in particular a two-dimensional electrode array.

In an embodiment, the electrowetting sample processing system further comprises periodically interconnected electrodes for simultaneously transporting droplets in the delivery zone.

In an embodiment of the electrowetting sample processing system, the electrodes are substantially identical and/or connected to a common electrical interface, in particular to an electrical connector and/or contact field.

In an embodiment of the electrowetting sample processing system, the electrodes are arranged in at least two different groups, each group comprising electrically interconnected electrodes that are operated according to a predetermined offset in time.

In an embodiment of the electrowetting sample processing system, the electrodes are configured to manipulate the droplets located in the processing zones independently and/or asynchronously from droplets located in the delivery zone.

In an embodiment, the electrowetting sample processing system further comprises electrodes for operating at least one waste removal zone, which is arranged at a side of the processing zone that is located opposite to the delivery zone.

In an embodiment, the electrowetting sample processing system further comprises a two-dimensional array with processing zones arranged in parallel, in particular an array with at least 4 zones, further in particular with at least 8 zones.

In an embodiment, the electrowetting sample processing system further comprises a liquid input feed, in particular a droplet generator or a continuous feed, that is configured to operate independently and/or asynchronously from the operation of electrodes used for electrowetting.

In another embodiment, an amount of the input liquid is transferred from the inlet port into the gap, such that the inserted liquid is controllable by at least one electrode, in particular by at least partially subsequent electrodes, and the least one electrode is configured to separate a liquid droplet from the inserted input liquid by operation electrodes used for electrowetting.

In an embodiment, the electrowetting sample processing system comprises a flexible cartridge, which is reversibly attachable to the electrodes of the electrowetting sample processing system, wherein in particular the cartridge comprises a flexible second part, further in particular a flexible film or the membrane.

In an embodiment, the electrowetting sample processing system or the cartridge comprises a processing zone, which is configured for processing samples, in particular for processing biological sample, and/or which is operably connected to the delivery zone.

The features of the above-mentioned embodiments of the electrowetting sample processing system can be used in any combination, unless they contradict each other.

A method for operating the cartridge according to the invention or for operating the electrowetting sample processing system according to the invention.

A method for operating a cartridge according to the invention that comprises an internal gap with at least one processing zone and at least one delivery zone, the method comprising:

providing an input liquid into an internal gap of the cartridge for providing at least one droplet, directly or via a liquid separation process within the cartridge;

transferring the at least one droplet to the at least one processing zone via the delivery zone by repeating pattern of interacting electrowetting force to the at least one droplet during its movement in the delivery zone.

In an embodiment of the method, the electrowetting force is provided by a plurality of electrodes, in particular by an electrode array, further in particular by a two-dimensional electrode array.

In an embodiment, the method further comprises the process of manipulating the at least one droplet located in the delivery zone independently and/or asynchronously from a droplet located in the at least one processing zone.

In an embodiment, the method further comprises delivering of the at least one droplet to a staging position prior to a need in the at least one processing zone and/or moving the at least one droplet into the at least one processing zone when required for processing.

The features of the above-mentioned embodiments of the method can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 an overview over an exemplary digital microfluidics system that is equipped with a central control unit and a base unit, with four cartridge accommodation sites and with four board accommodation sites for receiving an electrode board that each comprises an electrode array.

DETAILED DESCRIPTION OF THE INVENTION

Figure 1:
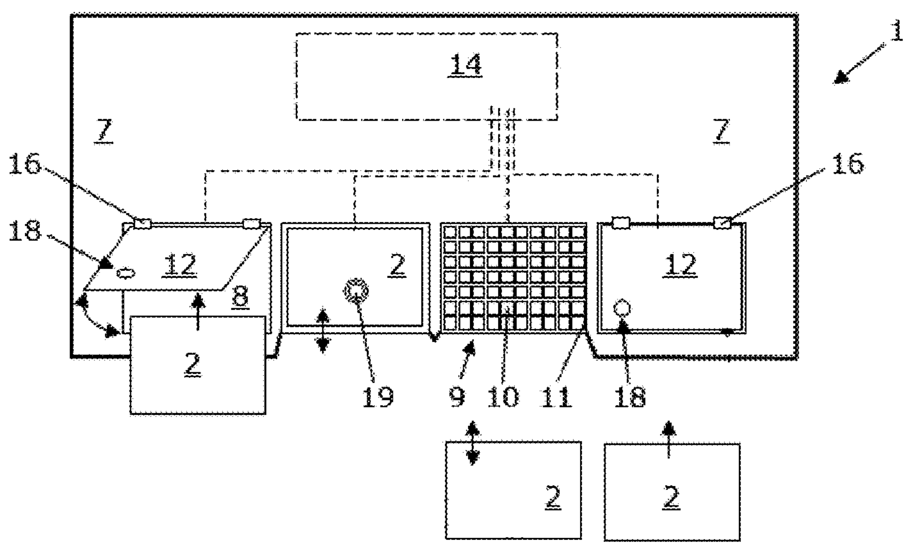

The FIG. 1 shows an overview over an electrowetting sample processing system exemplary shown as digital microfluidics system 1 that is equipped with a central control unit 14 and a base unit 7, with four cartridge accommodation sites 8 that each comprise an electrode array 9, and a cover plate 12. The digital microfluidics system 1 is configured for manipulating samples in liquid droplets within cartridges designed as disposable cartridges 2.

The digital microfluidics system 1 comprises a base unit 7 with at least one cartridge accommodation site 8 that is configured for taking up a disposable cartridge 2. The digital microfluidics system 1 can be a standalone and immobile unit, on which a number of operators are working with cartridges 2 that they bring along. The digital microfluidics system 1 thus may comprise a number of cartridge accommodation sites 8 and a number of electrode arrays 9 at least some of which can be located on electrode boards.

It may be preferred to integrate the digital microfluidics system 1 into a liquid handling workstation or into a Freedom EVO® robotic workstation, so that a pipetting robot can be utilized to transfer liquid portions and/or sample containing liquids to and from the cartridges 2. Alternatively, the system 1 can be configured as a handheld unit which only comprises and is able to work with a low number, e.g. a single disposable cartridge 2. Every person of skill will understand that intermediate solutions that are situated in-between the two extremes just mentioned will also operate and work within the gist of the present invention.

In an example, the digital microfluidics system 1 also comprises at least one board accommodation site for taking up an electrode board which comprises an electrode array 9 that substantially extends in a first plane and that comprises a number of electrodes 10. Such an electrode board preferably is located at each one of said cartridge accommodation sites 8 of the base unit 7. Preferably each electrode array 9 is supported by a bottom substrate 11. It is noted that the expressions "electrode array" or "electrode layout" together with the bottom substrate 11 and "printed circuit board (PCB)" are utilized herein as synonyms.

The digital microfluidics system 1 may also comprise at least one cover plate 12 with a top substrate; though providing of such cover plates 12 is particularly preferred, at least some of the cover plates may be dispensed with or may be re-placed by an alternative cover for holding a disposable cartridge 2 in place inside the base unit 7 of the microfluidics system 1. Thus, at least one cover plate 12 may be located at one of said cartridge accommodation sites 8. The cover plate 12 and the bottom substrate 11 with the electrode array 9 or PCB define a space or cartridge accommodation site 8, respectively. In a first variant (see the two cartridge accommodation sites 8 in the middle of the base unit 7, the cartridge accommodation sites 8 are configured for receiving a slidingly inserted disposable cartridge 2 that is movable in a direction substantially parallel with respect to the electrode array 9 of the respective cartridge accommodating site 8. Such front- or top-loading can be supported by a drawing-in automatism that, following a partial insertion of a disposable cartridge 2, transports the cartridge 2 to its final destination within the cartridge accommodation site 8, where the cartridge 2 is precisely seated. Preferably, these cartridge accommodation sites 8 do not comprise a movable cover plate 12. After carrying out all intended manipulations to the samples in liquid droplets, the used cartridges 2 can be ejected by the drawing-in automatism and transported to an analysis station or discarded.

In a second variant (see the two cartridge accommodation sites 8 on the right and left of the base unit 7), the cartridge accommodation sites 8 comprise a cover plate 12 that is configured to be movable with respect to the electrode array 9 of the respective cartridge accommodating site 8. The cover plate 12 preferably is configured to be movable about one or more hinges 16 and/or in a direction that is substantially normal to the electrode array 9.

Similar to the possibilities for inserting a disposable cartridge 2 into a cartridge accommodation site 8, exemplary possibilities for inserting the electrode board into a board accommodation site comprise the following alternatives:

(a) vertically lowering the electrode board through the respective cartridge accommodation site 8 and into the board accommodation site;

(b) horizontally sliding the electrode board below the respective cartridge accommodation site 8 and into the board accommodation site;

(c) horizontally sliding the electrode board below the respective cartridge accommodation site 8 and substantially vertically lifting into the board accommodation site.

The digital microfluidics system 1 also comprises a central control unit 14 for controlling the selection of the individual electrodes 10 of said at least one electrode array 9 and for providing these electrodes 10 with individual voltage pulses for manipulating liquid droplets within said cartridges 2 by electrowetting. As partly indicated in FIG. 1, respective electrodes 10 can be operatively connected to the central control unit 14 and therefore can be independently or commonly addressed by this central control unit 14, which also comprises the appropriate sources for creating and providing the necessary electrical potentials in a way known in the art.

In one example, the bottom substrate 11 or the PCB that contains the electrode array 9 or the electrodes 10 has an electrical connector, which connects to a relay PCB, which is connected to a control PCB, wherein the control PCB is part of the central control unit 14.

The at least one cover plate 12 preferably comprises an electrically conductive material that extends in a second plane and substantially parallel to the electrode array 9 of the cartridge accommodation site 8 the at least one cover plate 12 is assigned to. It is particularly preferred that this electrically conductive material of the cover plate 12 is configured to be not connected to a source of an electrical ground potential. The cover plate 12 can be configured to be movable in any arbitrary direction and no electrical contacts have to be taken into consideration when selecting a particularly preferred movement of the cover plate 12. Thus, the cover plate 12 may be configured to be also movable in a direction substantially parallel to the electrode array 9 and for carrying out a linear, circular or any arbitrary movement with respect to the respective electrode array 9 of the base unit 7.

Figure 2:
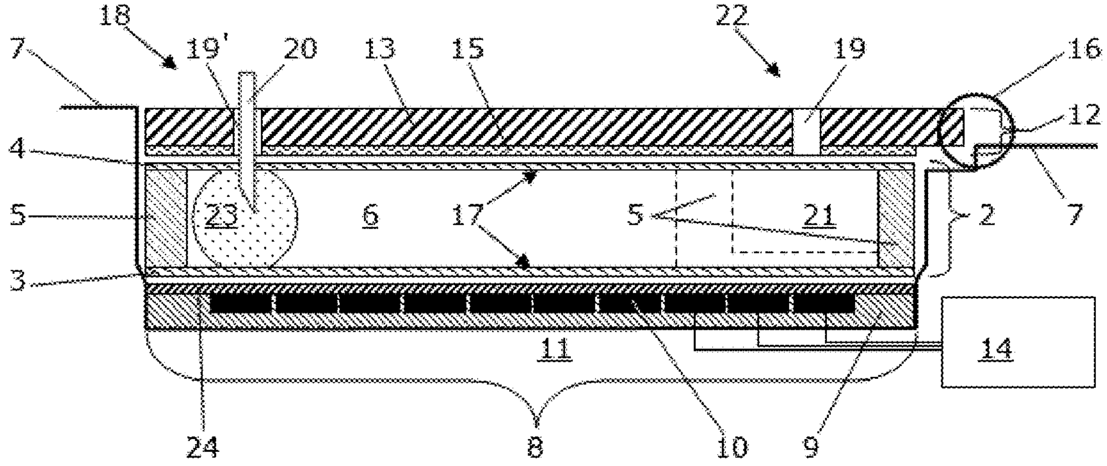
FIG. 2 a section view of one cartridge accommodation site with a disposable cartridge according to FIG. 1 therein; the electrode array being located on a fixed bottom substrate.

The FIG. 2 shows a section view of one exemplary cartridge accommodation site 8 with the disposable cartridge 2 according to FIG. 1 accommodated therein. The disposable cartridge 2 comprises a bottom layer 3 as a second part of the cartridge 2, a top layer 4 as a first part of the cartridge 2, and a spacer 5 that defines a gap 6 between the bottom and top layers 3,4 for manipulating samples in liquid droplets 23 in this gap 6.

The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). An electrically conductive material 15 of the cover plate 12 is configured as a thin metal plate or metal foil that is attached to the top substrate 13. Alternatively, the electrically conductive material 15 of the cover plate 12 is configured as a metal layer that is deposited onto the top substrate 13. Such deposition of the conductive material 15 may be carried out by chemical or physical vapor deposition techniques as they are known per se.

The cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into the perfect position on the electrode array 9 with respect to an optional piercing facility 18 of the cover plate 12. This piercing facility 18 is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown).

In the case shown in FIG. 2, the electrode array 9 is covered by a dielectric layer 24. The electrode array 9 is fixed to the bottom substrate 11, this combination is also called PCB, and respective electrodes 10 can be electrically and operationally connected with the central control unit 14 in a manner to be described in the following. The electrode array 9 can be located on the bottom substrate 11 in an immovably fixed manner. The digital microfluidics system 1 is configured for manipulating samples in liquid droplets 23 within a disposable cartridge 2 that contains a gap 6. Accordingly, the samples in liquid droplets 23 are manipulated in the gap 6 of the disposable cartridge 2. As mentioned above, the disposable cartridge 2 comprises the bottom layer 3, the top layer 4, and eventually the spacer 5 that defines the gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 may optionally be configured as a body that includes compartments 21 for reagents needed in an assay that is applied to the sample droplets in the gap 6 (dotted lines). In addition to the liquid droplets 23, that gap 6 may also contain a filler liquid, in particular a silicon oil, which at least partly fills the space within the gap 6.

In an alternative embodiment, a large amount of the input liquid is transferred from the inlet port into the gap, where the inserted liquid covers at least one drive electrode from an electrode path. Preferably, this input liquid covers, at least partially, subsequent electrodes from the path. A liquid droplet is separated from the input liquid by the provision of a drive voltage pulse to an electrode subsequent to the initial drive electrode along the path. The separated liquid droplet is then guided along the path.

Figure 3:
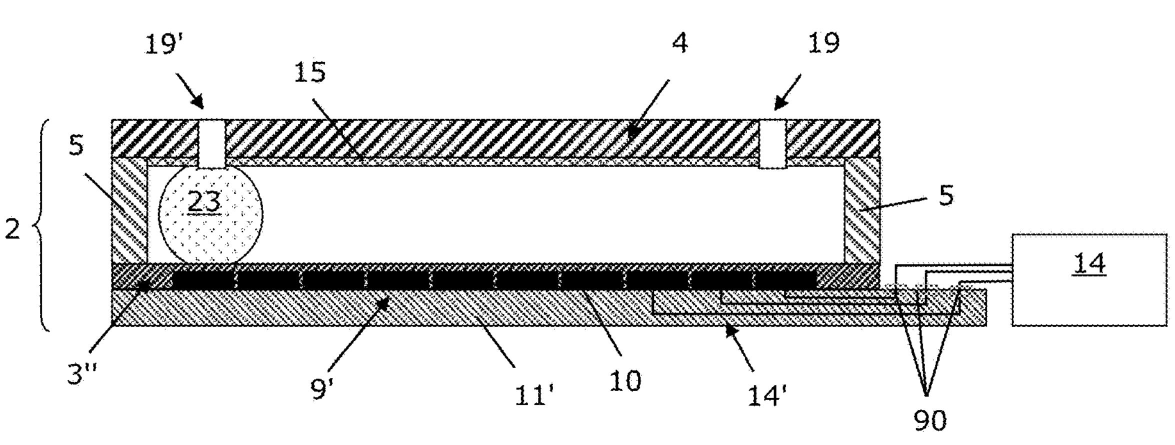
FIG. 3 a section view of a further exemplary cartridge accommodation site according to FIG. 2, wherein the electrode array is a part of the cartridge.

FIG. 3 shows a section view of a further exemplary cartridge accommodation site according to FIG. 2 with a cartridge 2, wherein—in contrast to FIG. 2—the cartridge 2 comprises an electrode array 9' of individual electrodes 10.

Further the cartridge 2 comprises an upper part 4, a spacer 5, a hydrophobic layer 3'', a support element 11' for the electrode array 9', an optional through hole 19, a liquid input port 19' and electrically conductive material. The upper part 4 and the spacer 5 may be provided as separate parts or in form of a single piece. The hydrophobic layer 3'', the electrode array 9' and the support element 11' form the lower part of the cartridge. The electrode array 9' is arranged between the hydrophobic layer 3'' and the support element 11' and the gap is formed between the upper part 4 and the hydrophobic layer 3''. Further, the hydrophobic layer 3'' is attached to a peripheral side structure of the upper part 4 resp. to the spacer 5. The support element 11' further comprises electrical connectors 14', which are connected via multiple electrical wires to the electrode array 9'. In turn, the electrical connectors 14' provide for a connection to a central control unit 14 such that the electrical connectors 14' implement an electrical interface 90 between cartridge 2 and the digital microfluidics system. The electrical interface 90 can also be implemented by a contact field, i.e. a plurality of electrically conductive, mutually insulated contact areas.

Figure 4:
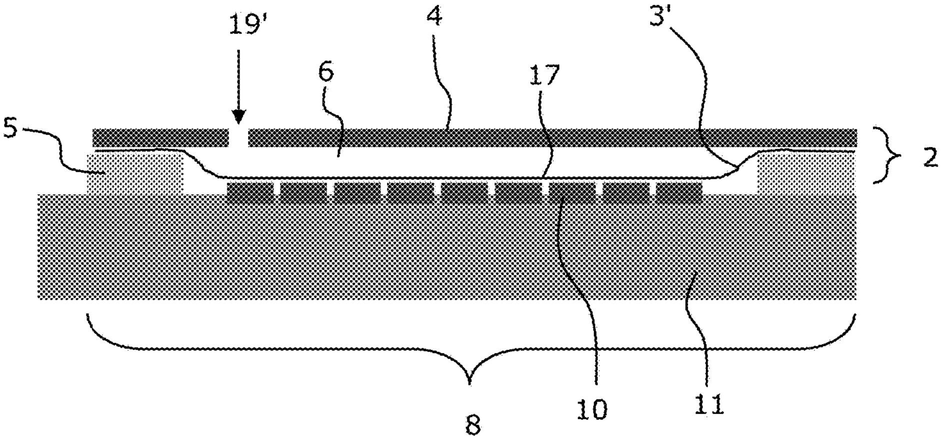
FIG. 4 a section view of an exemplary cartridge accommodation site with a disposable cartridge according to a further embodiment accommodated therein; the cartridge comprising a flexible bottom layer.
Figure 5:
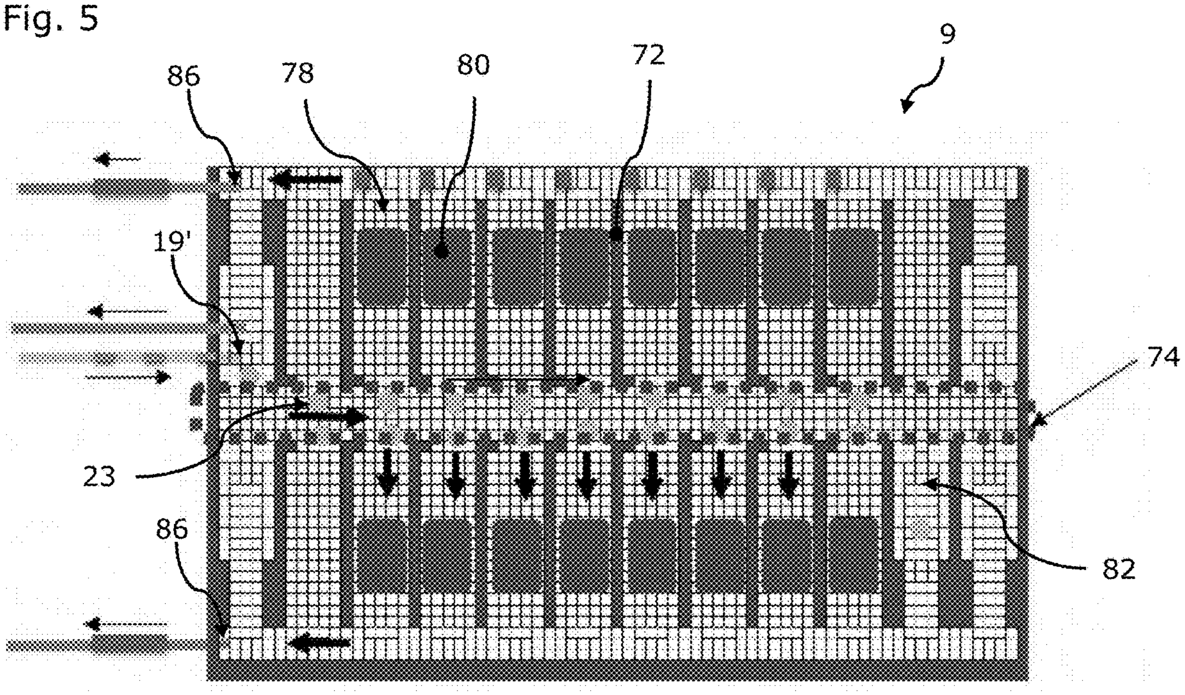
FIG. 5 a schematic view of an electrode array for exemplifying reagent droplets to be moved from the delivery zone to the processing zones.
Figure 6:
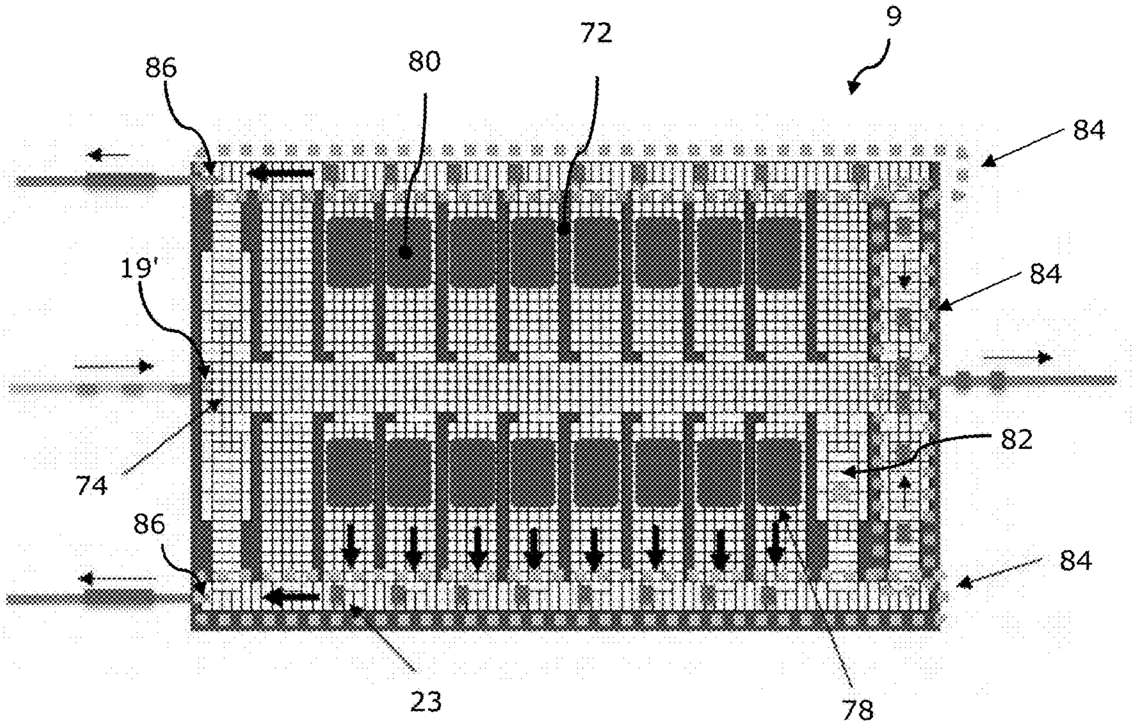
FIG. 6 a schematic view of an electrode array for exemplifying movement of reagent droplets into waste removal zones.

FIG. 4 shows a section view of one cartridge accommodation site 8 with a disposable cartridge 2 according to a further embodiment accommodated therein. The electrodes 10 are arranged on and fixed to the bottom substrate 11. The disposable cartridge 2 comprises a bottom layer 3' and a top layer 4. Attached to the disposable cartridge 2 is a spacer 5 that defines a gap 6 between the bottom and top layer 3',4 for manipulating samples in liquid droplets 23 (refer to FIG. 2 or 3) in this gap 6. In this embodiment, the bottom layer is a flexible bottom layer, for example a membrane 3', for example with a hydrophobic surface 17. For example, the membrane 3' is an 8 to 50 μm thick polypropylene film. A liquid input port 19' for introducing liquid into the gap 6 is provided in the top layer 4 of the cartridge 2.

Preferably, the flexible bottom layer 3' is reversibly attached to the electrodes 10 in an electrowetting sample processing system. The spacer 5 may be a part of the cartridge 2 or a part of the electrowetting sample processing system. In one example, the spacer 5 comprises stainless steel, aluminum, hard plastic, in particular COP or ceramic.

The spacer 5 may be designed to define the height of the gap 6. The spacer 5 may additionally serve as a gasket for sealing the gap 6.

The FIGS. 5 to 14 schematically depict PCBs (Printed Circuit Board) for electrowetting or rather electrode arrays 9 (also refer to FIGS. 1, 2 and 3) in different views, respectively. The electrode array 9 on the substrate 11, which in the present example could also be referred to as electrowetting PCB, comprises a plurality of electrodes 10 (schematically depicted as squares) arranged in an array to be described further in the following. The plurality of electrodes 10 are for applying an electrowetting force to droplets 23. The droplets 23 can be a microfluidic droplet and/or a liquid comprising at least one of a reagent, a buffer, a diluent, an extraction liquid, a washing liquid and a suspension, which in particular is a suspension of magnetic beads, single cells or cell aggregates. Samples are for example DNA (Desoxyribonucleic acid), RNA (Ribonucleic Acid), derivatives thereof, proteins, cells, or other biologically or biochemically derived molecules or combinations thereof. The electrode array 9 can be divided into multiple regions or rather zones to be described in the following. The plurality of electrodes 10 arranged in the respective zones can be controlled in a way dedicated to or rather based on the respective zones. Some of said zones can be separated by means of voids 72.

The center of the electrode array 9 contains electrodes which are comprised by or rather dedicated to a delivery zone 74 used to deliver multiple droplets 23 or rather reagents to processing zones 78. In other words, the delivery zone 74 is for delivering the droplets 23 from the liquid input port 19' to the processing zones 78. The processing zones 78 are in turn for simultaneously processing samples 80 which can be located therein. The processing zone 78 can be configured for processing at least one of a chemical reaction, a washing process, a heating process, a mixing process, a dilution, and a hybridization. The samples 80 located in the processing zones 78 can be manipulated independently and/or asynchronously from the droplets 23 located in the delivery zone 74. In the delivery zone 74, e.g. reagent droplets 23 which can be needed for a next reaction step or rather processing step can be positioned ahead of time such to be ready to enter a respective processing zone 78 once required (refer to e.g. FIG. 5).

Figure 7:
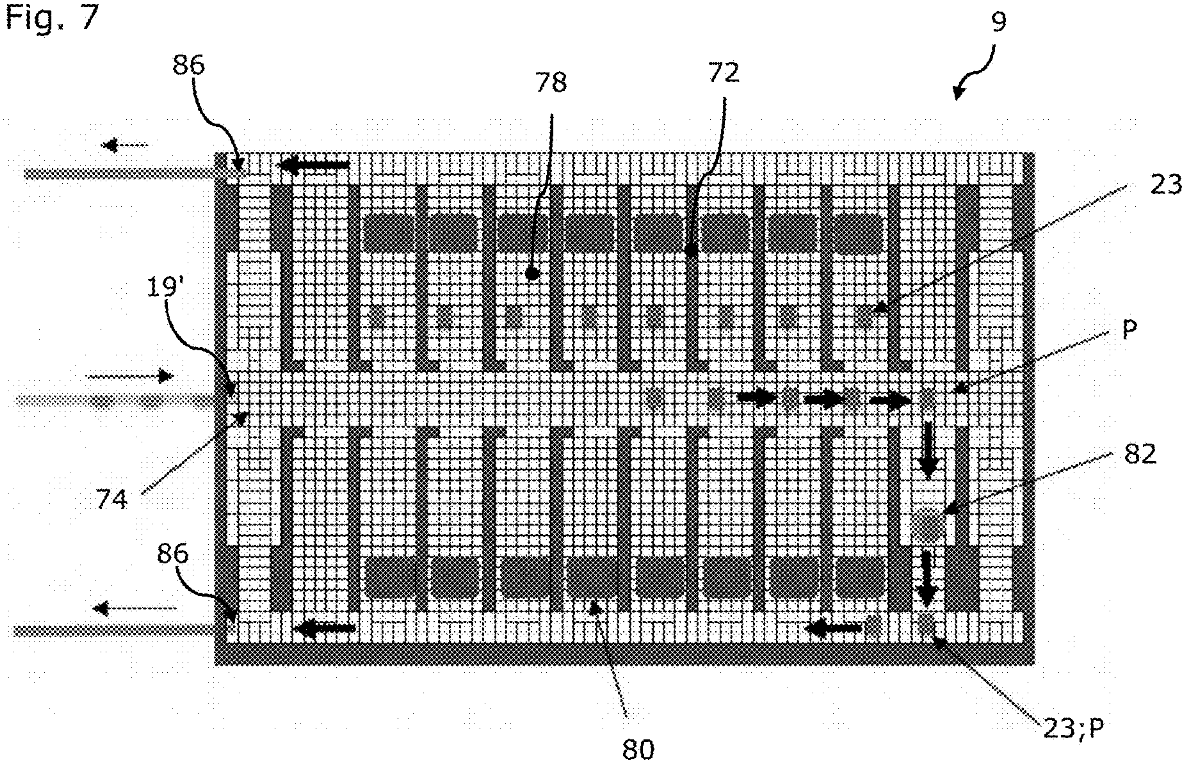
FIG. 7 a schematic view of an electrode array for exemplifying reagent droplets passing through an optical read position.
Figure 8:
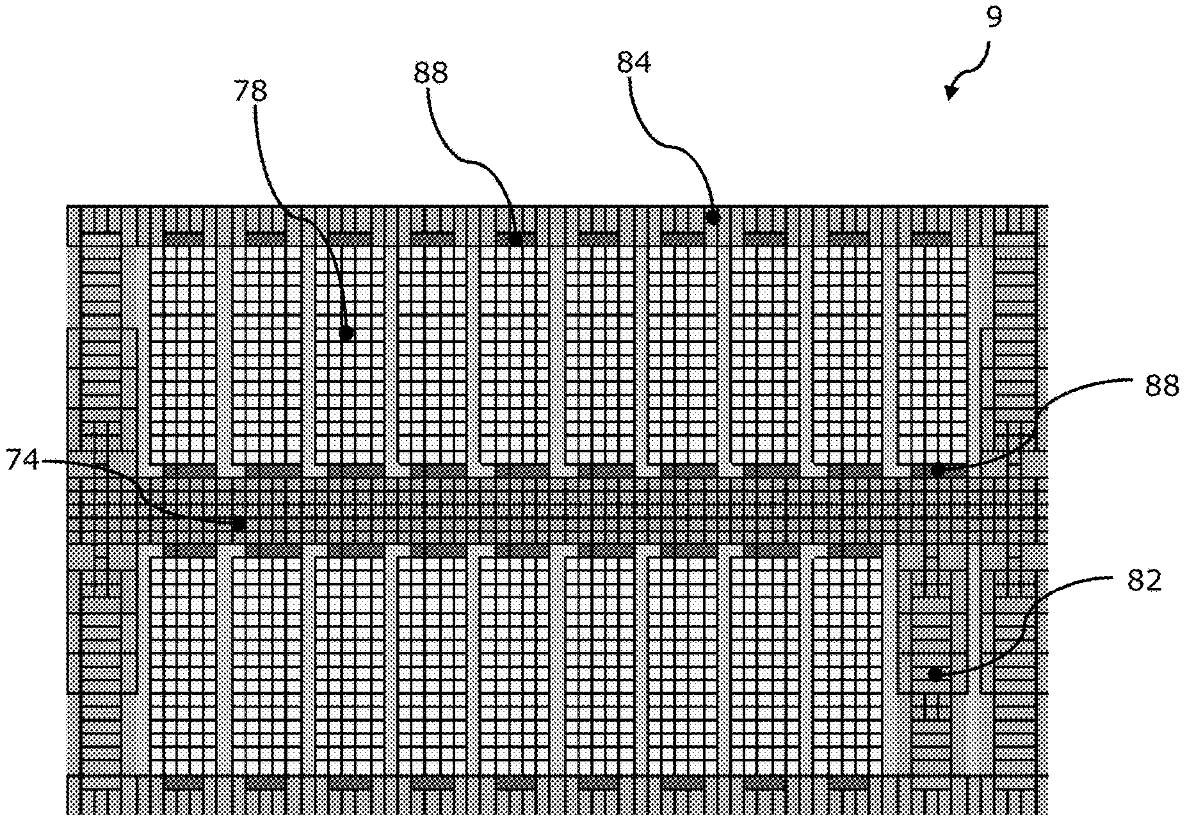
FIG. 8 a schematic view of an electrode array for exemplifying the delivery zone and processing zones separated from each other by gate electrodes.
Figure 9:
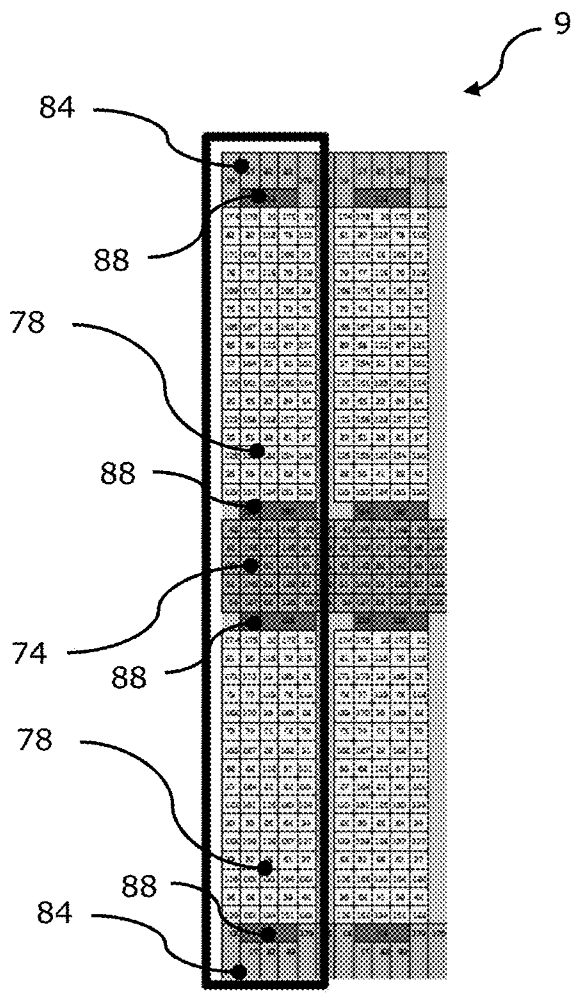
FIG. 9 a schematic view of an electrode array for exemplifying reduced wiring efforts due to sharing electrode control.

The electrode array 9 further comprises an optical reading zone 82 for optically reading out droplets 23 passing through said zone 82 in e.g. a path P (refer to FIG. 7). The reading out can be performed by means of e.g. fluorescent reading to be further described in the following. An exemplary step of an NGS (Next-Generation Sequencing) library prep assay can involve taking a sample of reaction fluid, which can contain e.g. DNA, adding a reagent that fluoresces in proportion to the amount of DNA present, and then measuring the fluorescence level of each sample droplet in the optical reading zone 82. From each sample, a sub-sample droplet can be fluorescently labeled and then moved by electrowetting to the optical read position 82. The path P followed by e.g. the sub-sample droplets 23 is labeled in FIG. 7. In some cases, droplets that contain sample DNA can be kept away from the delivery zone 74. However, since the reaction or rather processing is completed, maintaining this area in a clean state can be omitted. Furthermore, the effect of cross contamination between droplets moving to the optical reading zone 82 can be negligible since the droplets can be disposed after reading. In case of it is necessary to maintain cleanliness in the delivery zone 74, it would also be possible to move the droplets 23 into waste removal zones 84 (refer to e.g. FIG. 6) towards the optical reading zone 82. While the electrode array 9 is shown to comprise one optical reading zone 82, two or even more optical reading zones 82 can be comprised. In an example, the number of optical reading zones can be the number of processing zones 78. However, the ability to use a single optical reading zone 82 or rather a single fluorescent read position depends on the details of the assay being measured. In the case of the NGS library prep assay, the quantification of DNA level in the end product is not sensitive to sample cross-contamination. Therefore, using a single optical reading position (as shown in the drawings) can simplify the optical system.

The above-mentioned waste removal zones 84 can be arranged adjacent to the processing zones 78 and opposite to the delivery zone 74. In an example, reaction waste, which can be generated at various points of a biochemical assay, can be moved by electrowetting force from the processing zones 78 into the waste removal zone 84. Subsequently, the reaction waste e.g. can be moved to a waste removal port 86 where it can be pumped out of the cartridge. Reaction waste can be contaminated by sample DNA and therefore should only be moved into the waste region, i.e. waste removal zone 84. Waste droplets may merge together at the waste removal port 86 and grow in size until sucked out of the cartridge through the waste removal port 86. Given the contaminating potential of reagent waste, the layout of the shown electrode array 9 is advantageous in waste removal without crossing the path of clean reagents. In an example of waste removal, the waste droplets can be moved to the right and then merged at the center right (refer to FIG. 6).

The Figures show different electrode array 9 zones in a schematic view. As mentioned above, the electrode array 9 can be divided into different zones corresponding to different processing functions. The zones can comprise the delivery zone 74, the processing zones 78, the optical reading zone 82 and the waste removal zones 84. The processing zones 78 can be each separated from the delivery zone 74 as well as the waste removal zones 84 by means of gate electrodes 88 (e.g. refer to FIGS. 8 and 9). The electrodes of the processing zones 78 can be wired in parallel, i.e. each individual electrode within one processing zone 78 is electrically connected to its corresponding electrode in the other processing zones 78. Advantageously, this approach reduces the number of high voltage relays and wiring needed to actuate electrowetting control. Therefore, costs and complexity of the electrode array 9 can be reduced.

According to the present invention, the delivery zone 74 is configured to provide a repeating pattern of interacting electrowetting force for simultaneously transporting the droplets within the delivery zone 74. The Figures schematically shows an example of inventive mapping control channels through electrode array 9 wiring to the respective electrodes. The electrodes within the delivery zone 74 can be connected in parallel with a repeating pattern of independent control electrodes. Similar repeating control patterns can be used e.g. in the waste electrode zones 84 or throughout the electrode array 9. Once required, respective electrodes can be wired independently, such as e.g. the gate electrodes 88 arranged between the processing zones 78 and the delivery zone 74 and/or waste removal zones 84. Hence, during operation, separate control of entrance paths of each of said processing zones 78 can be achieved. Summarized, by sharing electrode control, wiring efforts can be reduced and parallel operations with a simpler, lower cost electrode array 9 can be achieved. In the FIG. 9, the electrodes pattern shown surrounded by a black box can be repeating with e.g.

the exception of the gate electrodes 88 which can be controlled individually if necessary.

Figure 10:
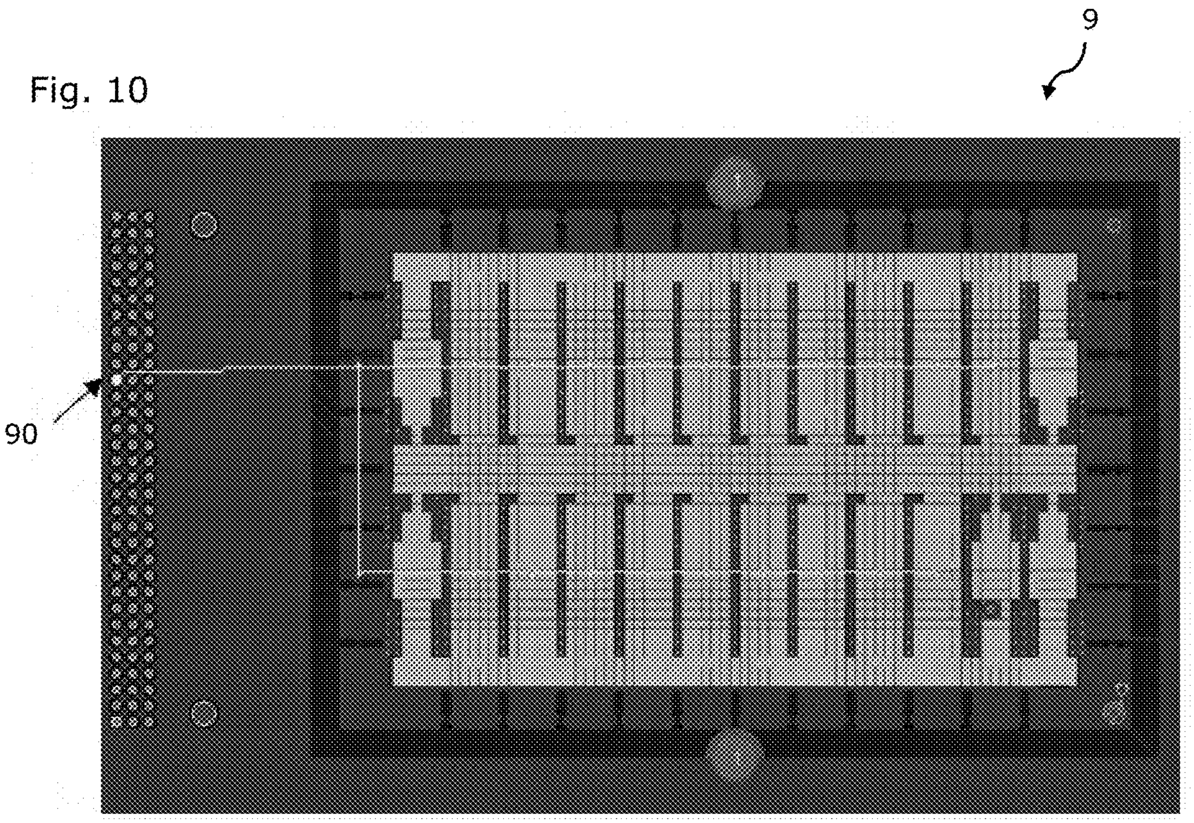
FIG. 10 an electrode array comprising processing zones including a plurality of electrodes connected to a common electrical interface.
Figure 11:
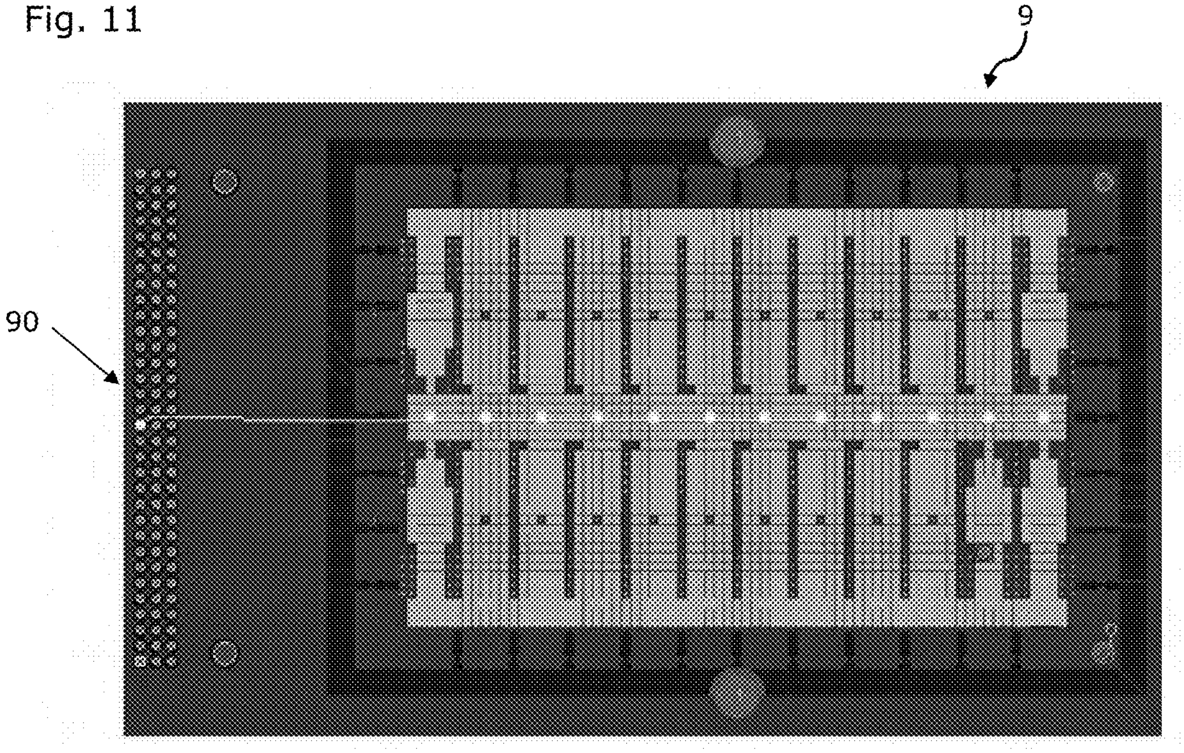
FIG. 11 an electrode array comprising a delivery zone including a plurality of electrodes connected to a common electrical interface.

As can be seen in the FIGS. 10 and 11, the delivery zone 74 comprises substantially identical and spaced apart electrodes that can be electrically connected to a common electrical interface 90 of e.g. the cartridge. The common electrical interface 90 can be configured as an electrical connector and/or contact field. The invention allows that droplets located in the processing zones 78 can be manipulated independently and/or asynchronously from droplets located in the delivery zone 74 and vice-versa.

Figure 12:
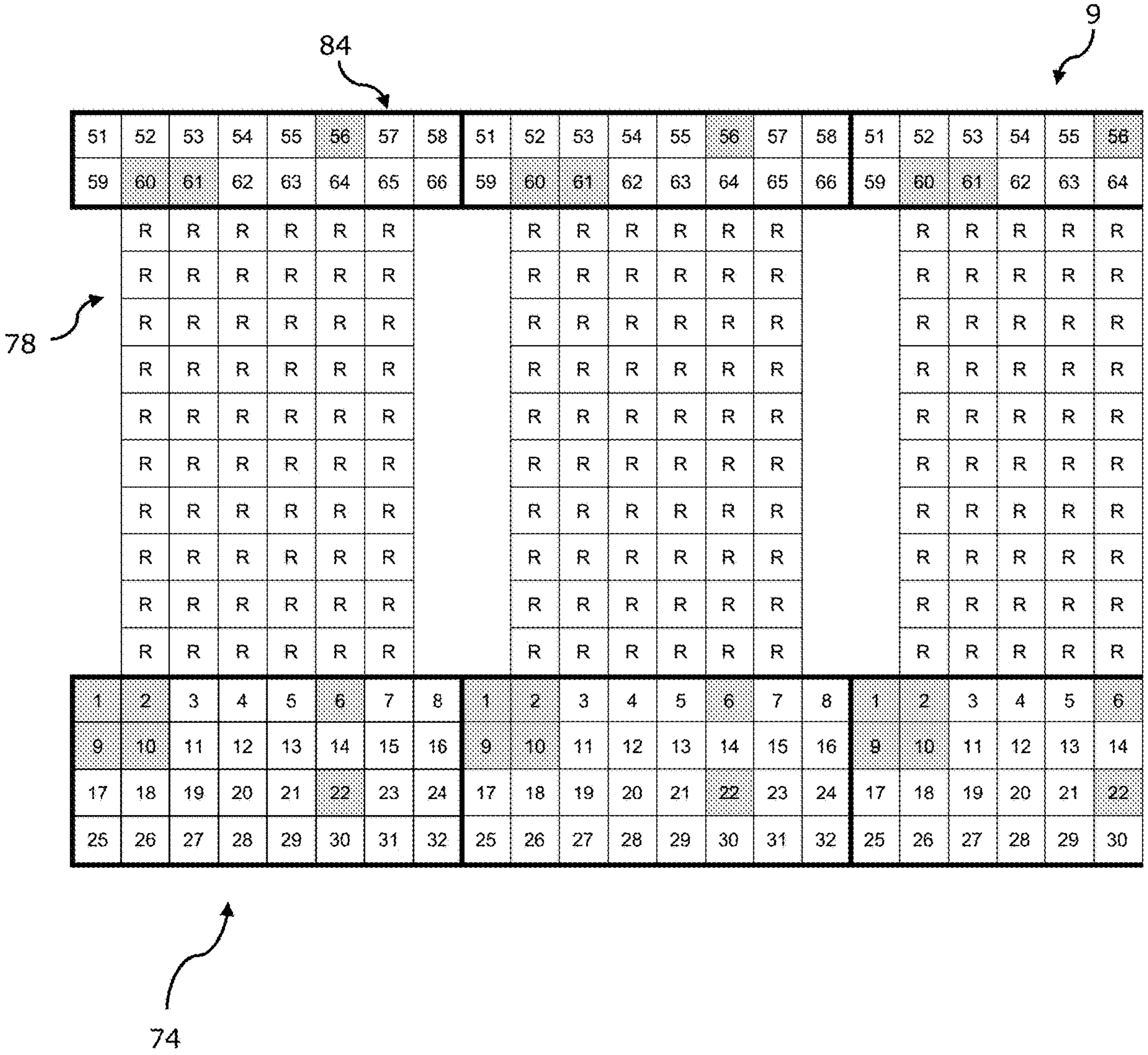
FIG. 12 a schematic view of the mapping of electrodes arranged in the waste removal zone, the processing zone and the delivery zone, respectively.

The FIG. 12, in an enlargement view, schematically shows mapping of electrodes arranged in the waste removal zone 84, the processing zone 78 (schematically depicted as composed of "R" electrodes), and the delivery zone 74, respectively. In the shown example, the electrodes within the delivery zone 74 are connected in parallel with a repeating control pattern, as schematically depicted by respective equal electrode numbers. Similar repeating control patterns can be used in the waste electrode zones 84. While not shown, similar repeating control patterns can be used in respective regions or throughout the electrode array 9. Sharing of electrode control achieves parallel operations resulting in a simple electrode array 9 with reduced costs.

Figure 13:
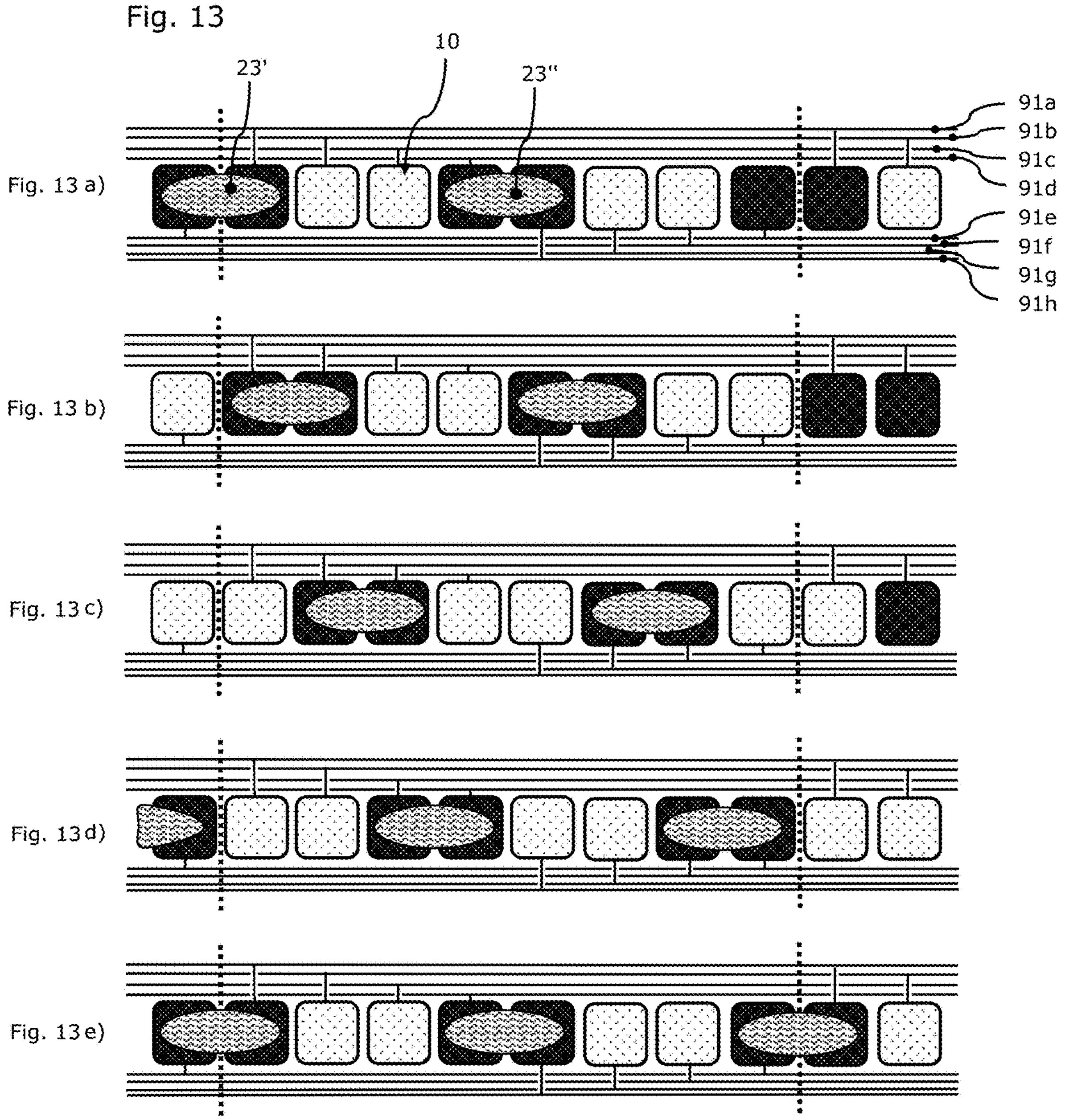
FIG. 13*a-e* a schematic wiring of electrodes such to provide a repeating pattern of interacting electrowetting force to droplets for simultaneously transporting thereof.

The FIG. 13 exemplary shows the wiring of electrodes 10 comprised by e.g. the delivery zone (refer to FIGS. 5 to 9). The electrodes 10 are wired such to provide a repeating pattern of interacting electrowetting force to the droplets 23 for simultaneously transporting the droplets 23 within e.g. the delivery zone. In the shown FIG. 13, the droplets 23 are transported in a direction from left to right. In doing so, the electrodes 10 are supplied with high voltages via lines 91*a*-91*d* in an upper row and lines 91*e*-91*h* in a lower row in a controlled manner to be described further in the following. The lines 91*a*-91*d*, 91*e*-91*h* can be electrically connected to a common electrical interface (not shown). A repeated pattern can comprise at least four electrodes in longitudinal direction, at least two of them being operated differently. In the FIG. 13, a repeating pattern comprising eight electrodes is shown bracketed by dashed lines. Each of said electrodes is connected to a single line in e.g. the order of lines 91*a*, 91*b*, 91*c*, 91*d*, 91*h*, 91*g*, 91*f* and 91*e*.

The droplets, i.e. a first droplet 23' and a further droplet 23", are transported in sequence by applying high voltage to pairs of adjacent electrodes, which each are separated from each other by two (non-applied) electrodes. The first droplet 23' shown in FIG. 13*a* on the left side is transported by applying voltage to lines 91*e* & 91*a* (see FIG. 13*a*); lines 91*a* & 91*b* (see FIG. 13*b*); lines 91*b* & 91*c* (see FIG. 13*c*); lines 91*c* & 91*d* (see. FIG. 13*d*); lines 91*d* & 91*h* (see FIG. 13*e*), etc. As can be seen, this pattern can be repeated in a various number of times, while the number of wiring lines still remains the same, e.g. the second droplet 23". In other words, the exemplary wiring still requires eight lines for operating a various number (e.g. larger than eight) of electrodes 10. Therefore, the present invention allows to substantially reduce the number of wiring lines while still further allowing reliable and steady transport of the droplets 23. Hence, wiring efforts are reduced and space is minimized while further reducing costs.

Figure 14:
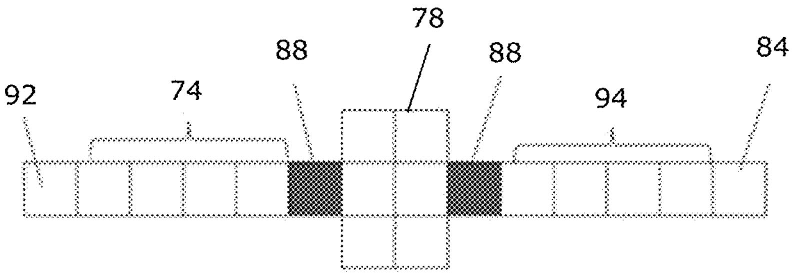
FIG. 14 a schematic view of an electrode array showing a delivery zone, a processing zone and a waste delivery zone separated from each other by gate electrodes.

As exemplarily shown in FIG. 14, the delivery zone 74 by one side thereof is adjacent to one processing zone 78. The opposite side of the delivery zone 74 is e.g. adjacent to a droplet delivery zone 92. In an example, the delivery zone 74 and the processing zone 78 are separated from each other by a gate electrode 88, which provides a staging position for the droplet 23',23" (refer to FIG. 13) prior to its need in the processing zone 78 (refer to e.g. FIG. 8). The processing zone 78 by its opposite side can be adjacent to a waste delivery zone 94. In an example, the processing zone 78 and the waste delivery zone 94 are separated from each other by a further gate electrode 88. The waste delivery zone 94 can proceed to the waste removal zone 84. In this example, droplets located in the processing zone 78 can be manipulated independently and/or asynchronously from droplets located in the delivery zone 74 and vice-versa. Further, droplets located in the processing zone 78 can be manipulated independently and/or asynchronously from droplets located in the waste delivery zone 94 and vice-versa.

Preferred dimensions and materials are pointed to in table 1. These indications of materials and dimensions serve as preferred examples without limiting the scope of the present invention.

TABLE 1

| Part | No | Material | Dimensions and Shape |
|---|---|---|---|
| Droplet | 23 | aqueous | Volume: 0.1-5 μl |
| Substrate | 11 | Synth. Polymer | — |
| Electrodes | 10 | Al; Cu; Au; Pt | Plating: 1.5 × 1.5 mm |
| Electrode Array | 9, 9' | Electrodes | 1 or 2 dimensional |
| Film | 3 | Fluorinated ethylene propylene (FEP), Cyclo olefin polymer (COP), Polypropylene (PP) | Thickness: 8-50 μm |
| Hydrophobic surface | 17 | Teflon ® (PTFE), COP, FEP, PP, Cytop | Thickness: 8-50 μm Coating: 2-200 nm Spin coating: 5-500 nm, preferably 20 nm |
| Rigid cover | 4 | Mylar ®; acrylic; Polypropylene (PP) | 65 × 85 mm; Plate: 0.5-25.0 mm, preferably 1.5 mm |
| Gap | 6 | — | 0.2-2.0 mm, preferably 0.5 mm |
| Pipetting orifice | 19 | — | Diameter: 0.3-3.0 mm |
| Spacer, Gasket | 5 | Polypropylene (PP), Synthetic or natural rubber | Frame: 0.2-2.0 mm, preferably 0.5 mm |
| Electrowetting filler liquid | | Silicon oil | Volume: 1-5 ml |

REFERENCE SIGNS LIST

| | |
|---|---|
| 1 | electrowetting sample processing system |
| 2 | disposable cartridge |
| 3 | bottom layer |
| 3' | membrane |
| 3" | hydrophobic layer |
| 4 | top layer |
| 5 | spacer |
| 6 | gap between 3 and 4 |
| 7 | base unit |
| 8 | cartridge accommodation site |
| 9, 9' | electrode array |
| 10 | electrodes |
| 11 | bottom substrate |
| 11' | support element |
| 12 | cover plate |
| 13 | top substrate |
| 14 | central control unit |
| 14' | electrical connectors |
| 15 | electrically conductive material |
| 16 | hinge |
| 17 | hydrophobic surface |
| 18 | piercing facility |

-continued

| REFERENCE SIGNS LIST | |
|---|---|
| 19 | through hole |
| 19' | liquid input port |
| 20 | piercing pipette tip |
| 21 | compartment |
| 23 | droplet |
| 24 | dielectric layer |
| 40 | board accommodation site |
| 72 | void |
| 74 | delivery zone |
| 78 | processing zone |
| 80 | sample |
| 82 | optical reading zone |
| 84 | waste removal zone |
| 86 | waste removal port |
| 88 | gate electrode, staging position |
| 90 | electrical interface |
| 91a-h | lines |
| 92 | droplet delivery zone |
| 94 | waste delivery zone |
| P | path |

The invention claimed is:

1. A method for operating a cartridge in an electrowetting sample processing system, the cartridge comprising, a liquid input port, an internal gap with at least one hydrophobic surface, at least two processing zones for processing samples located in the at least two processing zones and a delivery zone for delivering multiple droplets from the liquid input port to the at least two processing zones, wherein the method comprises:

introducing an input liquid into the internal gap of the cartridge, the input liquid providing for at least one droplet, directly or via a liquid separation process within the internal gap;

providing a repeating pattern of interacting electrowetting force for simultaneously and only unidirectionally transporting multiple droplets within the delivery zone;

delivering the at least one droplet from the liquid input port to one of the at least two processing zones.

2. The method according to claim 1, wherein the electrowetting force is provided by an electrode array.

3. The method according to claim 2, wherein the electrowetting force is provided by a two-dimensional electrode array.

4. The method according to claim 1, comprising the process of manipulating the at least one droplet located in the delivery zone independently and/or asynchronously from a droplet located in the at least two processing zones.

5. The method according to claim 1, comprising delivering of the at least one droplet to a staging position prior to a need in the at least one processing zone and/or moving the at least one droplet into one of the at least two processing zones when required for processing.

6. The method according to claim 1, comprising the step of inserting the cartridge into the electrowetting sample processing system and/or removing the cartridge from the electrowetting sample processing system.

7. The method according to claim 1, wherein the cartridge comprises at least two separate processing zones and the method comprises simultaneously and/or identically processing samples located in the at least two processing zones.

8. The method according to claim 1, wherein the at least one droplet is a microfluidic droplet and/or a liquid comprising at least one of: a reagent, a buffer, a diluent, an extraction liquid, a washing liquid and a suspension.

9. The method according to claim 1, wherein the cartridge comprises a first part with the liquid input port and a second part attached to the first part, such that the gap is formed between the first part and the second part.

10. The method according to claim 9, wherein the first part comprises a rigid body and/or the second part comprises or is an electrode support element or a flexible film.

11. The method according to claim 10, wherein the flexible film is a polymer film and/or an electrically isolating film.

12. The method according to claim 10, wherein the second part is attached to a peripheral side structure of the first part.

13. The method according to claim 9, wherein the gap is defined by a spacer that is arranged between the first part and the second part.

14. The method according to claim 13, wherein the spacer comprises the liquid input port and wherein the at least one of the two parts of the cartridge is selected from the group consisting of a flexible part and a rigid part of the cartridge.

15. The method according to claim 1, wherein the delivery zone comprises a plurality of electrodes for applying an electrowetting force to the droplets.

16. The method according to claim 15, wherein the plurality of electrodes is an electrode array.

17. The method according to claim 1, wherein the delivery zone comprises substantially identical and spaced apart electrodes that are electrically connected to a common electrical interface of the cartridge.

18. The method according to claim 17, wherein the repeating pattern comprises at least four electrodes in longitudinal direction, at least two of them being operated differently.

19. The method according to claim 1, wherein the method comprises manipulating droplets located in the at least two processing zones independently and/or asynchronously from droplets located in the delivery zone.

20. The method according to claim 1, wherein the cartridge comprises at least one waste removal zone configured to provide a repeating pattern of electrowetting force for simultaneously transporting multiple droplets within the at least one waste removal zone.

21. The method according to claim 20, wherein the at least one waste removal zone is arranged adjacent to the at least two processing zones and opposite to the delivery zone, and the cartridge further comprises at least one optical reading zone adjacent to the at least two processing zones.

22. The method according to claim 1, wherein the cartridge comprises a waste removal line with an output port.

23. The method according to claim 22, wherein the output port is arranged adjacent to the liquid input port.

24. The method according to claim 1, wherein the electrowetting sample processing system is a biological sample processing system.

25. The method according to claim 1, wherein the electrowetting sample processing system comprises a plurality of electrodes for applying an electrowetting force to the multiple droplets.

26. The method according to claim 25, wherein the plurality of electrodes is an electrode array.

27. The method according to claim 26, wherein the plurality of electrodes is a two-dimensional electrode array.

28. The method according to claim 1, wherein the electrowetting sample processing system comprises periodically interconnected electrodes for simultaneously transporting multiple droplets in the delivery zone.

29. The method according to claim 28, wherein the electrodes are substantially identical and/or connected to a common electrical interface.

30. The method according to claim 29, wherein the common electrical interface is an electrical connector and/or contact field.

31. The method according to claim 28, wherein the electrodes are arranged in at least two different groups, each group comprising electrically interconnected electrodes that are operated according to a predetermined offset in time.

32. The method according to claim 28, wherein the electrodes manipulate at least one of the multiple droplets located in at least one of the at least two processing zones independently and/or asynchronously from further of the multiple droplets located in the delivery zone.

33. The method according to claim 1, wherein the electrowetting sample processing system comprises a controller for providing electrical control signals to a plurality of electrodes.

34. The method according to claim 33, wherein the controller provides electrical control signals to the plurality of electrodes via an electrical interface of the cartridge.

35. The method according to claim 1, wherein the electrowetting sample processing system comprises electrodes for operating at least one waste removal zone, which is arranged at a side of the at least two processing zones that is located opposite to the delivery zone.

36. The method according to claim 1, wherein the electrowetting sample processing system comprises a two-dimensional array with the at least two processing zones arranged in parallel.

37. The method according to claim 36, wherein the two-dimensional array with the at least two processing zones arranged in parallel is an array with at least 4 zones.

38. The method according to claim 36, wherein the two-dimensional array with the at least two processing zones arranged in parallel is an array with at least 8 zones.

39. The method according to claim 1, wherein the electrowetting sample processing system comprises a liquid input feed that is configured to operate independently and/or asynchronously from the operation of electrodes used for electrowetting.

40. The method according to claim 39, wherein the liquid input feed is selected from the group consisting of a droplet generator or a continuous feed.

41. The method according to claim 1, wherein the cartridge is a disposable cartridge.

42. The method according to claim 1, wherein the at least one droplet is a liquid comprising a suspension and the suspension is selected from a group consisting of a suspension of magnetic beads, a suspension of single cells and a suspension of cell aggregates.

43. The method according to claim 1, wherein the repeating pattern provides a steady transport of the multiple droplets.

44. A method for operating a cartridge that comprises an internal gap with at least two processing zones and a delivery zone, the method comprising:

providing an input liquid into the internal gap of the cartridge for providing at least one droplet, directly or via a liquid separation process within the cartridge;

providing a repeating pattern of interacting electrowetting force for simultaneously and only unidirectionally transporting multiple droplets within the delivery zone;

transferring the at least one droplet to one of the at least two processing zones via the delivery zone by applying the repeating pattern of interacting electrowetting force to the at least one droplet during its movement in the delivery zone.

* * * * *